(12) United States Patent
Iinuma

(10) Patent No.: US 11,402,002 B2
(45) Date of Patent: Aug. 2, 2022

(54) BALL SCREW DEVICE

(71) Applicant: JTEKT CORPORATION, Osaka (JP)

(72) Inventor: Yusuke Iinuma, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/329,836

(22) Filed: May 25, 2021

(65) Prior Publication Data

US 2021/0381584 A1    Dec. 9, 2021

(30) Foreign Application Priority Data

Jun. 8, 2020    (JP) ............................... JP2020-099508

(51) Int. Cl.
    *F16H 25/22*      (2006.01)
    *B62D 5/04*      (2006.01)
    *F16H 25/20*      (2006.01)

(52) U.S. Cl.
    CPC ....... *F16H 25/2214* (2013.01); *B62D 5/0448* (2013.01); *F16H 2025/2081* (2013.01)

(58) Field of Classification Search
    CPC ......... F16H 25/2214; F16H 2025/2081; F16H 25/2228; F16H 2025/228; B62D 5/0448
    See application file for complete search history.

(56) References Cited

U.S. PATENT DOCUMENTS 10,767,741 B1 *   9/2020   Liu ..................... F16H 25/2015
2019/0136947 A1 *   5/2019   Nakayama .......... F16H 25/2219
2019/0168799 A1 *   6/2019   Ogata .................... B62D 3/08
2020/0003286 A1 *   1/2020   Sun .................... F16H 25/2219
2022/0097752 A1 *   3/2022   Enomoto ............... B62D 5/04

FOREIGN PATENT DOCUMENTS

| EP | 3 306 135 A1 | 4/2018 |
|---|---|---|
| JP | 2015-132308 A | 7/2015 |
| WO | 01/11264 A1 | 2/2001 |
| WO | 2013/112597 A1 | 8/2013 |

OTHER PUBLICATIONS

Nov. 4, 2021 Extended Search Report issued in European Patent Application No. 21176133.3.

\* cited by examiner

*Primary Examiner* — Zakaria Elahmadi
(74) *Attorney, Agent, or Firm* — Oliff PLC

(57) ABSTRACT

A ball screw device includes a plurality of ball screw devices. In one ball screw device, a recirculation member is larger than the recirculation member in another ball screw device in terms of one mounting dimension of two mounting dimensions selected from a circumferential length of a part at a side of a pick-up opening portion in each pick-up portion, a circumferential length of a part at a side opposite to the pick-up opening portion in each pick-up portion, a circumferential length of a connection passage portion and an axial length of the connection passage portion, and the recirculation member is smaller than the recirculation member in the other ball screw device in terms of another mounting dimension of the two mounting dimensions, the other ball screw device being different in a diameter of a screw shaft from the one ball screw device.

7 Claims, 6 Drawing Sheets

BALL SCREW DEVICE

CROSS-REFERENCE TO RELATED APPLICATION

This application claims priority to Japanese Patent Application No. 2020-099508 filed on Jun. 8, 2020, incorporated herein by reference in its entirety.

BACKGROUND

1. Technical Field

The disclosure relates to a ball screw device.

2. Description of Related Art

There have been automobile steering systems in which an axial thrust is generated for a rack shaft via an electric motor to assist operation of the rack shaft (for example, Japanese Patent Application Publication No. 2015-132308). In the steering system described in JP 2015-132308 A, a rotational force of the electric motor is converted into an axial thrust via a ball screw device and transmitted to the rack shaft.

The ball screw device in JP 2015-132308 A is a deflector-type ball screw device. The ball screw device includes a screw shaft with a helical ball screw groove provided in an outer peripheral surface thereof and a nut with a helical ball screw groove provided in an inner peripheral surface thereof. The respective ball screw grooves of the screw shaft and the nut are disposed in such as manner as to face each other. Thus, a rolling passage in which a plurality of balls can roll is provided by the ball screw grooves.

SUMMARY

In a ball screw device, a desired axial load can be obtained by changing an outer diameter of a screw shaft and an inner diameter of a nut. However, it is preferable not to change the outer diameter of the nut so much because of, e.g., restrictions in steering system designing. Consequently, a situation occurs, in which a plurality of ball screw devices that are not greatly different in outer appearance but are different in load specification are manufactured separately. Then, in many cases, these ball screw devices are manufactured on the same production line from the perspective of production cost.

In the case where ball screw devices having different specifications are manufactured on the same production line, there is a concern that when a deflector is assembled to a nut, a deflector with a wrong specification may be mistakenly assembled to the nut.

The disclosure provides a ball screw device that makes it possible to easily prevent erroneous assembling when a plurality of ball screw devices are manufactured.

A ball screw device according to a first aspect of the disclosure includes a plurality of ball screw devices. Each of the plurality of ball screw devices includes a screw shaft including a helical outer peripheral rolling groove provided in an outer peripheral surface of the screw shaft; a tubular nut including a helical inner peripheral rolling groove provided in an inner peripheral surface of the nut such that the inner peripheral rolling groove faces the outer peripheral rolling groove; a plurality of balls rollably disposed in a rolling passage provided between the outer peripheral rolling groove and the inner peripheral rolling groove; and a recirculation member that provides a shortcut between two points in the rolling passage and forms a recirculation passage that allows the balls to be endlessly circulated between the recirculation passage and the rolling passage. The recirculation member includes i) a pair of pick-up portions whose respective longitudinal directions are set to be a circumferential direction of the nut, the pick-up portions being disposed point-symmetrically to each other and each including a pick-up opening portion that opens toward the inner peripheral surface of the nut at an end in the longitudinal direction and a connection portion that communicates with the pick-up opening portion and that opens toward a side of an outer peripheral surface of the nut, and ii) a connection passage portion that is joined between the pick-up portions and that includes a through-hole connecting the connection portions. In one ball screw device of the plurality of ball screw devices, the recirculation member is larger than the recirculation member in another ball screw device of the plurality of ball screw devices in terms of one mounting dimension of two mounting dimensions selected from a circumferential length of a part at a side of the pick-up opening portion in each of the pick-up portions, a circumferential length of a part at a side opposite to the pick-up opening portion in each of the pick-up portions, a circumferential length of the connection passage portion and an axial length of the connection passage portion, and the recirculation member is smaller than the recirculation member in the other ball screw device in terms of another mounting dimension of the two mounting dimensions, the other ball screw device being different in a diameter of the screw shaft from the one ball screw device.

A ball screw device according to a second aspect of the disclosure includes a plurality of ball screw devices. Each of the plurality of ball screw devices includes a screw shaft including a helical outer peripheral rolling groove provided in an outer peripheral surface of the screw shaft; a tubular nut including a helical inner peripheral rolling groove provided in an inner peripheral surface of the nut such that the inner peripheral rolling groove faces the outer peripheral rolling groove, a pair of mounting holes radially extending through an outer periphery of the nut and an inner periphery of the nut, and an axially extending recirculation groove provided in an outer peripheral surface of the nut; a plurality of balls rollably disposed in a rolling passage provided between the outer peripheral rolling groove and the inner peripheral rolling groove; and a pair of recirculation members that provides a shortcut between two points in the rolling passage and forms a recirculation passage that allows the balls to be endlessly circulated between the recirculation passage and the rolling passage. Respective longitudinal directions of the recirculation members are set to be a circumferential direction of the nut, the recirculation members are inserted in the respective mounting holes of the nut and disposed point-symmetrically to each other, and each of the recirculation members includes a pick-up opening portion that opens toward the inner peripheral surface of the nut at an end in the longitudinal direction, and a connection portion that communicates with the pick-up opening portion and that opens toward the outer peripheral surface of the nut. The connection portion is connected to the recirculation groove. Each of the recirculation members includes projection portions provided at an outer peripheral side of the nut, the projection portions projecting in the circumferential direction of the nut. In one ball screw device of the plurality of ball screw devices, each of the recirculation members is larger than each of the recirculation members in another ball screw device of the plurality of ball screw devices in terms of one mounting dimension of mounting dimensions that are a circumferential length of the projection portion at a side of the pick-up opening portion of each of the recirculation members and a circumferential length of the projection portion at a side opposite to the pick-up opening portion of each of the recirculation members, and each of the recirculation members is smaller than each of the recirculation members in the other ball screw device in terms of another mounting dimension of the mounting dimensions, the other ball screw device being different in a diameter of the screw shaft from the one ball screw device.

In the above first aspect of the disclosure, the recirculation member includes i) the pair of pick-up portions whose respective longitudinal directions are set to be a circumferential direction of the nut, the pick-up portions being disposed point-symmetrically to each other, and ii) the connection passage portion joined between the pick-up portions. In the case where two or more ball screw devices that are different in screw shaft diameter are compared with each other, the ball screw device according to the above aspect of the disclosure is larger than another ball screw device in terms of at least one of the mounting dimensions and is smaller than the other ball screw device in terms of at least another one of the mounting dimensions.

The recirculation member is assembled to the nut by being inserted to a mounting recess portion that is provided in the outer peripheral surface of the nut and that conforms to a contour of the recirculation member. In ball screw devices A and B that are different in screw shaft diameter, the recirculation member of the ball screw device A includes a part that is smaller in mounting dimension than that of the recirculation member of the ball screw device B and a part that is larger in mounting dimension than that of the recirculation member of the ball screw device B. In other words, the recirculation member of the ball screw device B also includes a part that is smaller in mounting dimension than that of the recirculation member of the ball screw device A and a part that is larger in mounting dimension than that of the recirculation member of the ball screw device A. For example, in the case where an attempt is made to mount the recirculation member of the ball screw device A in the mounting recess portion provided in the nut of the ball screw device B, the recirculation member cannot be mounted because of the part that is larger in mounting dimension interfering with the mounting recess portion. Likewise, in the case where an attempt is made to mount the recirculation member of the ball screw device B in the mounting recess portion provided in the nut of the ball screw device A, also, the recirculation member cannot be mounted because of the part that is larger in mounting dimension interfering with the mounting recess portion. Consequently, it is possible to prevent erroneous assembling when a plurality of ball screw devices are manufactured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Example

Figure 1:
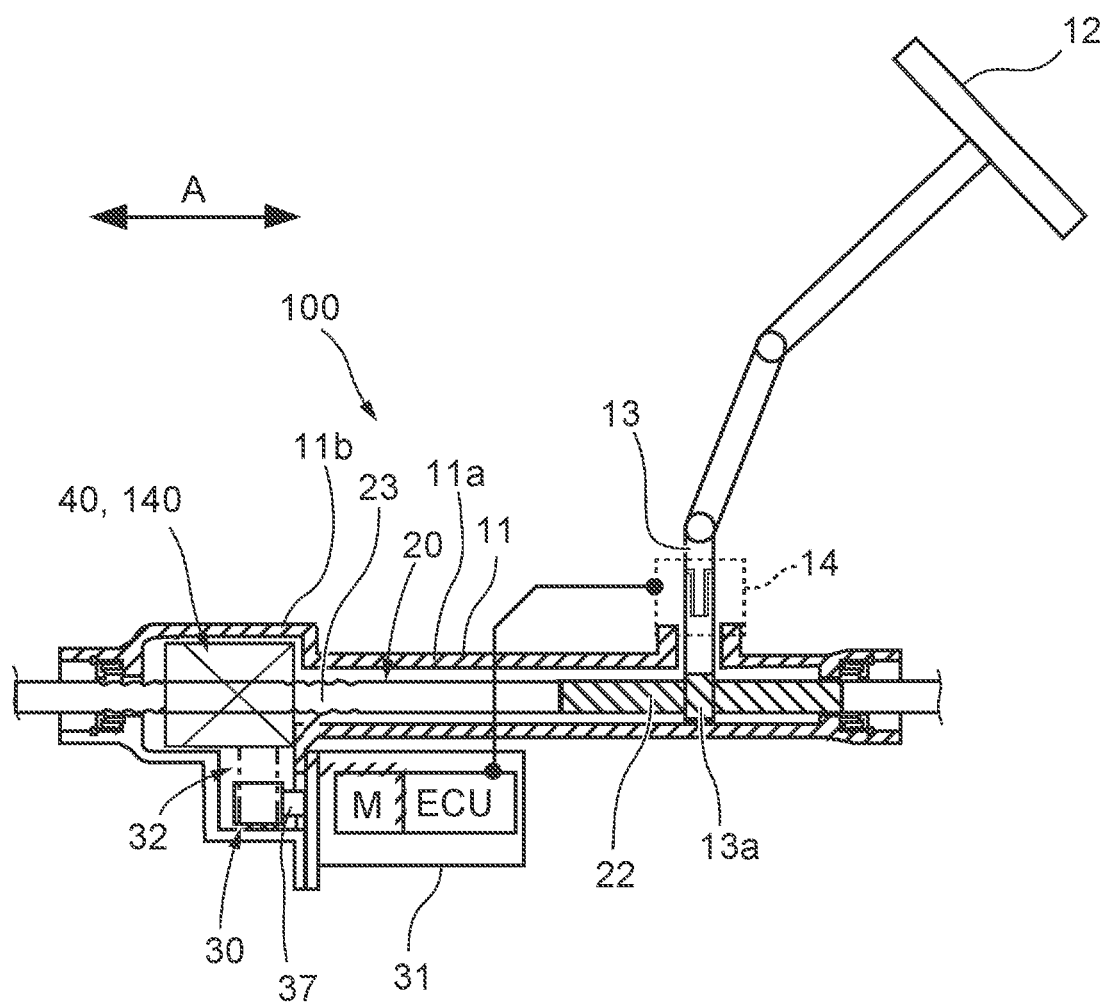
FIG. 1 is a schematic diagram illustrating an electronic power steering system including a ball screw device according to a first example.

A ball screw device 40 according to a first example will be described with reference to FIGS. 1 and 2. FIG. 1 is an overall view of an electronic power steering system, which illustrates an example in which the ball screw device 40 is applied to an electronic power steering system of a vehicle. Note that the ball screw device 40 is applicable to any of various systems to which a ball screw device can be applied such as a four-wheel steering system, a rear-wheel steering system and a steer-by-wire system, in addition to an electronic power steering system.
Configuration of Power Steering System An electronic power steering system 100 (hereinafter also simply referred to as "steering system 100") is a steering system that assists a steering force with use of a steering assist force.

The electronic power steering system 100 is a system that changes a direction of steered wheels of the vehicle by causing a turning shaft 20 joined to the steered wheels to reciprocate in direction A coinciding with an axial direction of the turning shaft 20 (right-left direction in FIG. 1).

As illustrated in FIG. 1, the steering system 100 includes a housing 11, a steering wheel 12, a steering shaft 13, a torque detection device 14, a motor M, the turning shaft 20, a steering assist mechanism 30 and the ball screw device 40.

The housing 11 is a fixed member fixed to the vehicle. The housing 11 has a tubular shape and allows the turning shaft 20 to be inserted therethrough such that the turning shaft 20 is movable relative to the housing 11 in the direction A. The housing 11 includes a first housing 11a and a second housing 11b fixed to one end side (left side in FIG. 1) of the first housing 11a in the direction A.

The steering wheel 12 is fixed to an end portion of the steering shaft 13 and is rotatably supported inside a cabin of the vehicle. The steering shaft 13 transmits a torque applied to the steering wheel 12 by a driver's operation, to the turning shaft 20.

A pinion 13a included in a rack-and-pinion mechanism is provided at an end portion at the turning shaft 20-side of the steering shaft 13. The torque detection device 14 detects a torque applied to the steering shaft 13, based on an amount of twisting (i.e., an amount of torsion) of the steering shaft 13.

The turning shaft 20 extends in the direction A. A rack 22 is provided in the turning shaft 20. The rack 22 engages with the pinion 13a of the steering shaft 13 and forms the rack-and-pinion mechanism jointly with the pinion 13a. For the rack-and-pinion mechanism, a maximum axial force that can be transmitted between the steering shaft 13 and the turning shaft 20 is set based on, e.g., usage of the steering system 100.

Also, a ball screw portion 23 is provided at a position that is different from the position of the rack 22 in the turning shaft 20. The ball screw portion 23 forms the ball screw device 40 jointly with a later-described nut 21 and receives a steering assist force transmitted by the steering assist mechanism 30. Opposite ends of the turning shaft 20 are joined to the right and left steered wheels (illustration omitted) via, e.g., tie rods and knuckle arms (illustration omitted), and the steered wheels are steered in a right-left direction by axial movement of the turning shaft 20 in the direction A.

The steering assist mechanism 30 is a mechanism that provides a steering assist force to the turning shaft 20 using the motor M as a drive source. The steering assist mechanism 30 includes the motor M, a control section ECU that drives the motor M and a drive force transmission mechanism 32. The motor M, and the control section ECU for driving the motor M are housed in a case 31 fixed to the first housing 11a of the housing 11. The control section ECU determines the steering assist torque based on an output signal of the torque detection device 14 to control an output of the motor M.

Figure 2:
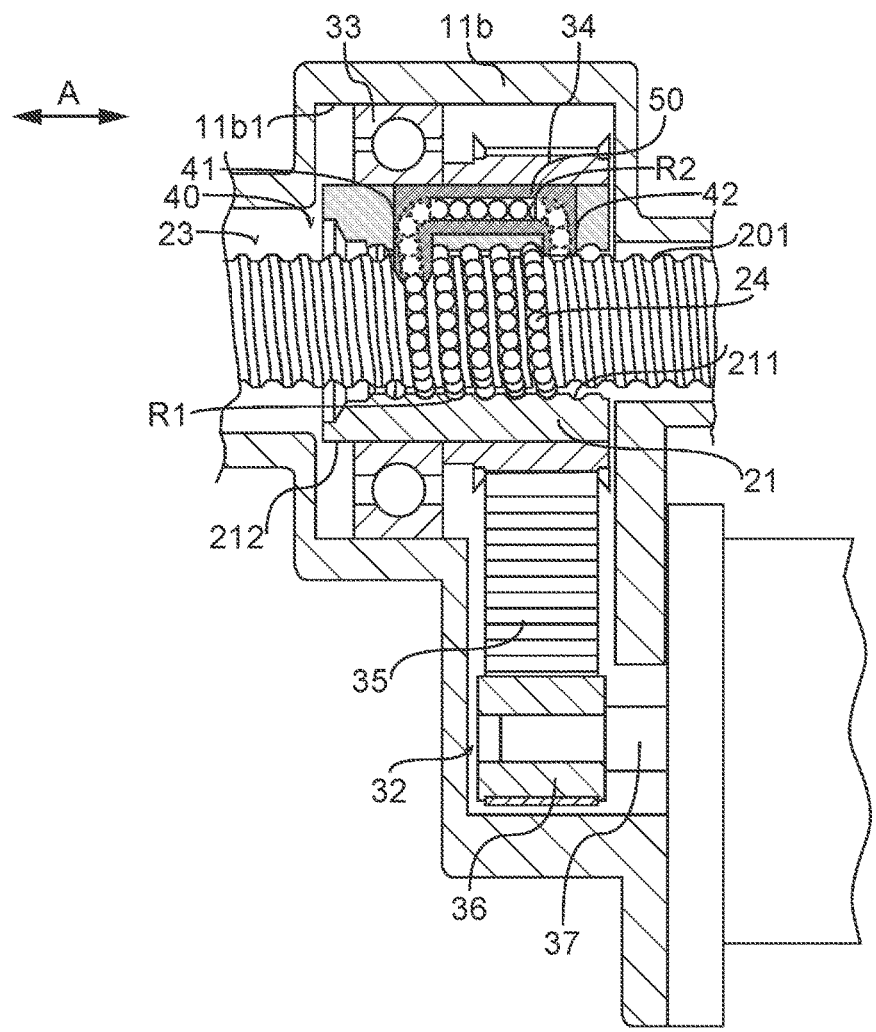
FIG. 2 is an enlarged view of a steering assist mechanism and the ball screw device in FIG. 1.
Figure 3:
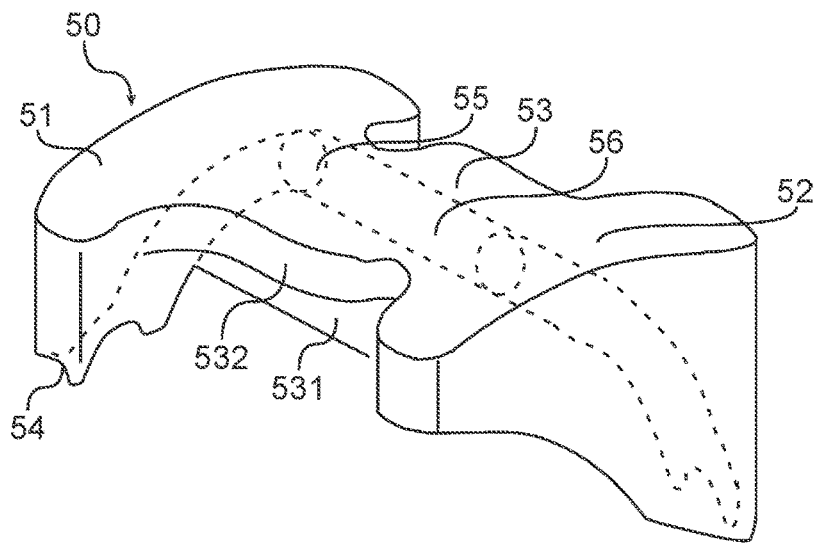
FIG. 3 is a perspective view illustrating a recirculation member according to the first example.

As illustrated in FIG. 2, the drive force transmission mechanism 32 includes a drive pulley 36, a driven pulley 34 and a toothed belt 35. The drive pulley 36 is mounted on an output shaft 37 of the motor M. The output shaft 37 is disposed in parallel with the axis of the turning shaft 20. The driven pulley 34 is disposed on the side of the outer periphery of the nut 21 in such a manner as to be rotatable together with the nut 21. One end side (left side in FIG. 2) of the nut 21 in the direction A is rotatably supported by an inner peripheral surface 11b1 of the second housing 11b via a ball bearing 33. The toothed belt 35 is looped around the drive pulley 36 and the driven pulley 34. The drive force transmission mechanism 32 transmits a rotational drive force generated by the motor M, between the drive pulley 36 and the driven pulley 34 via the toothed belt 35.

Overall Configuration of Ball Screw Device

As illustrated in FIG. 2, the ball screw device 40 is mainly housed inside the second housing 11b. The ball screw device 40 includes the ball screw portion 23 of the turning shaft 20 (corresponding to a screw shaft), the nut 21, a plurality of rolling balls 24 and a recirculation member 50. An outer peripheral rolling groove 201 provided in a helical manner is provided in an outer peripheral surface of the ball screw portion 23 of the turning shaft 20. The outer peripheral rolling groove 201 has a plurality of turns.

The nut 21 has a tubular shape and is disposed on the side of the outer periphery of the ball screw portion 23 coaxially with the ball screw portion 23 (turning shaft 20). An inner peripheral surface of the nut 21 includes an inner peripheral rolling groove 211 provided in a helical manner. The inner peripheral rolling groove 211 has a plurality of turns. The outer peripheral rolling groove 201 of the ball screw portion 23 and the inner peripheral rolling groove 211 of the nut 21 are disposed in such a manner as to face each other and a rolling passage R1 in which the plurality of rolling balls 24 roll is formed by the outer peripheral rolling groove 201 and the inner peripheral rolling groove 211. The plurality of rolling balls 24 are arranged in such a manner as to be rollable inside the rolling passage R1. Consequently, the outer peripheral rolling groove 201 of the ball screw portion 23 (turning shaft 20) and the inner peripheral rolling groove 211 of the nut 21 are threadedly connected via the plurality of rolling balls 24.

Figure 4:
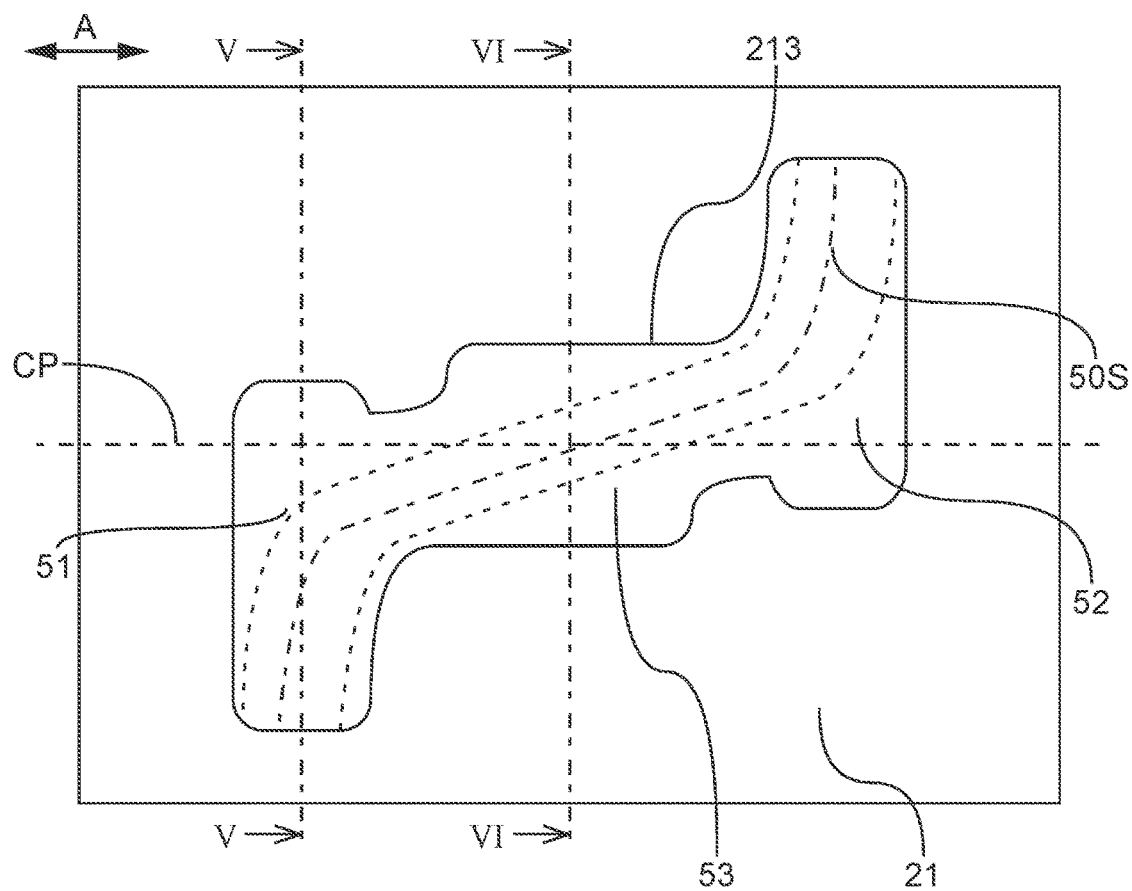
FIG. 4 is a diagram illustrating an outer appearance of a nut with the recirculation member according to the first example mounted therein.
Figure 5:
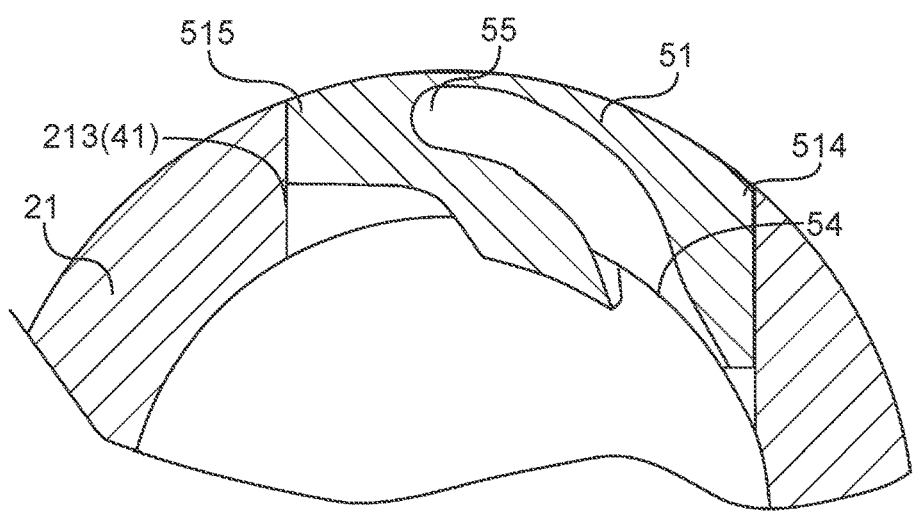
FIG. 5 is a sectional view along V-V in FIG. 4.

Also, as illustrated in FIGS. 4 and 5, the nut 21 includes a mounting recess portion 213 that houses the recirculation member, in an outer peripheral surface 212. The mounting recess portion 213 includes a pair of mounting holes 41, 42 extending through between the outer peripheral surface 212 and the inner peripheral surface of the nut 21 and a connection groove 43 connecting the mounting holes 41, 42. The mounting holes 41, 42 are disposed apart in the direction A from each other and point-symmetrically to each other such that the plurality of turns of the inner peripheral rolling groove 211 of the nut 21 are disposed between the mounting holes 41, 42.

The recirculation member 50, which is a deflector, is housed in the mounting recess portion 213 of the nut 21 and forms a recirculation passage R2 that provides a shortcut between two points in the rolling passage R1 and allows the balls 24 to be endlessly circulated between the recirculation member 50 and the rolling passage R1.

Structure of Recirculation Member

A structure of the recirculation member 50 will be described with reference to FIGS. 3 to 6. The recirculation member 50 includes a pair of pick-up portions 51, 52 whose respective longitudinal directions are set to be a circumferential direction of the nut 21 and are housed in the respective mounting holes 41, 42 of the nut 21. The pick-up portions 51, 52 have the same configuration, and thus, only the pick-up portion 51 will be described. The pick-up portion 51 includes a through-hole, and the through-hole includes a pick-up opening portion 54 that opens toward the inner peripheral surface of the nut 21 at one end in the longitudinal direction. A connection portion 55 that communicates with the pick-up opening portion 54 of the pick-up portion 52 via a through-hole is provided at another end of the through-hole.

The pick-up portions 51, 52 are disposed apart from each other in an axial direction of the nut 21 such that the respective connection portions 55 face each other. A distance between the pick-up portions 51, 52 may be kept constant (i.e., kept uniform) irrespective of the specification of the ball screw device 40. In other words, in a plurality of ball screw devices that are different in screw shaft diameter, lengths of the recirculation members 50 in the axial directions of the nuts 21, and leads of the ball screws may be uniform. If the length of the recirculation member 50 in the axial direction of the nut 21 is constant, the number of turns of the inner peripheral rolling groove 211 of the nut 21 over which the recirculation member 50 strides is constant. Consequently, an axial length of a part in which the nut 21 and the ball screw portion 23 are threadedly connected is kept constant. Also, the lead of the ball screw may be made constant and respective sectional shapes and dimensions of the rolling grooves 201, 211 of the screw shaft and the nut and a diameter of each of the balls 24 may be made constant. In this case, in the plurality of ball screw devices that are different in screw shaft diameter, if an axial load of the ball screw applied per ball is the same (i.e., the axial load is constant), a distribution of stress on the balls and the rolling grooves is substantially the same (i.e., the distribution of stress is substantially constant). Results on performance and durability of a ball screw designed and evaluated with one screw shaft diameter, that is, one pitch circle diameter, can be used to design another ball screw including a screw shaft having a different diameter and to estimate a result of evaluation of the other ball screw, and thus, it becomes easy to design performance and durability, including an axial load, of each of ball screws for a plurality of ball screw devices that are different in screw shaft diameter.

The pick-up portion 51 is housed in the mounting hole 41 of the nut 21 and fixed to the nut 21. A bottom portion of the pick-up portion 51 is provided in such a manner as to conform to a circular arc shape of the inner peripheral surface of the nut 21. The through-hole in the pick-up portion 51 extends substantially in a direction tangent to the rolling passage R1 from the inner peripheral surface of the nut 21 toward the outer peripheral surface of the nut 21 and is then inclined in the circumferential direction of the nut to pick up the balls 24 rolling in the rolling passage R1 from the pick-up opening portion toward the outer peripheral surface of the nut 21.

Between the pair of pick-up portions 51, 52 disposed in such a manner as to face each other, a connection passage portion 53 is provided in such a manner as to be joined integrally to the pick-up portions 51, 52. The connection passage portion 53 includes a connection passage 56 that is the through-hole connecting the connection portions 55 of the pick-up portions 51, 52. Consequently, a continuous pathway is provided from one pick-up opening portion 54 to the other pick-up opening portion 54 through one connection portion 55, the connection passage 56 and the other connection portion 55, and the pathway serves as a recirculation passage R2.

Figure 6:
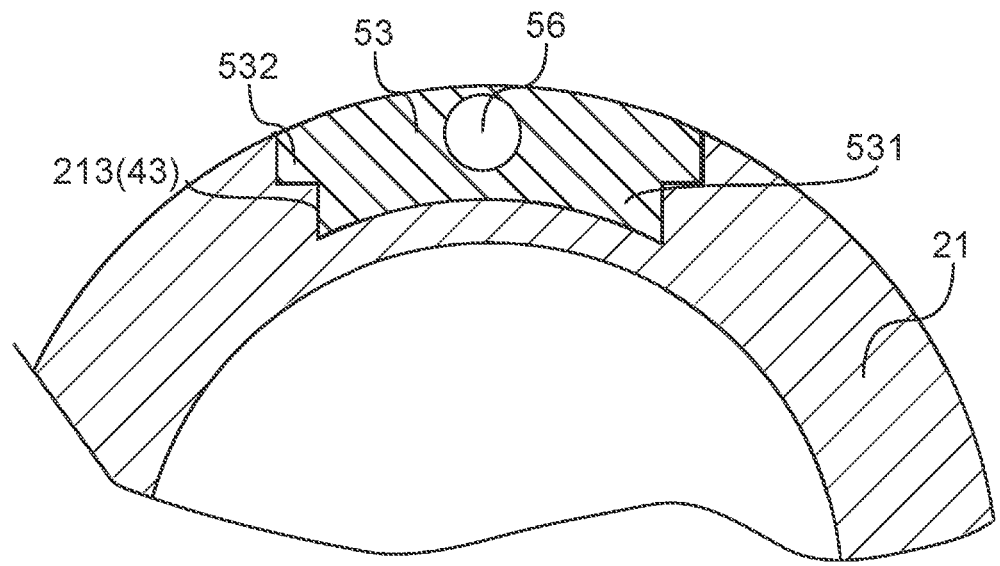
FIG. 6 is a sectional view along VI-VI in FIG. 4.

The connection passage portion 53 is housed in the mounting recess portion of the nut 21, and includes a body portion 531 in which the connection passage 56 is provided, and a projection portion 532 that is provided at the outer peripheral side of the nut 21, and that projects to opposite sides in the circumferential direction of the nut 21. As illustrated in FIG. 6, the connection passage portion 53 has a substantial T-shape in which the part, at the outer peripheral side of the nut 21, of the connection passage portion 53 projects, in a section orthogonal to the axial direction of the nut 21. An amount (length) of projection of the projection portion 532 can arbitrarily be set regardless of the form of the recirculation passage R2. As illustrated in FIG. 4, the recirculation member 50 is divided into two parts by a division plane 50S that is a curved plane provided by displacing in parallel, in a radial direction of the nut, a line extending substantially along a center line of the recirculation passage R2. This makes it easy to form the recirculation passage R2. Depending on the manufacturing method and shape of the recirculation member 50, the entire recirculation member 50 may be provided as an integral component (i.e., a one-piece component).

Assembling of Ball Screw Device

The recirculation member 50 is assembled to the nut 21 by being inserted into the mounting recess portion 213 provided in the outer peripheral surface 212 of the nut 21. The mounting recess portion 213 has a shape corresponding to a contour of the recirculation member 50 and the shape is determined according to mounting dimensions of the recirculation member 50. The mounting dimensions of the recirculation member 50 are selected from a circumferential length of a pick-up opening portion 54-side part 514 of the pick-up portion 51 (i.e., a part 514 at a side of the pick-up opening portion 54 in the pick-up portion 51), a circumferential length of an opposite-side part 515 at a side opposite to the pick-up opening portion 54 in the pick-up portion 51, a circumferential length of the connection passage portion 53 and an axial length of the connection passage portion 53.

Figure 7:
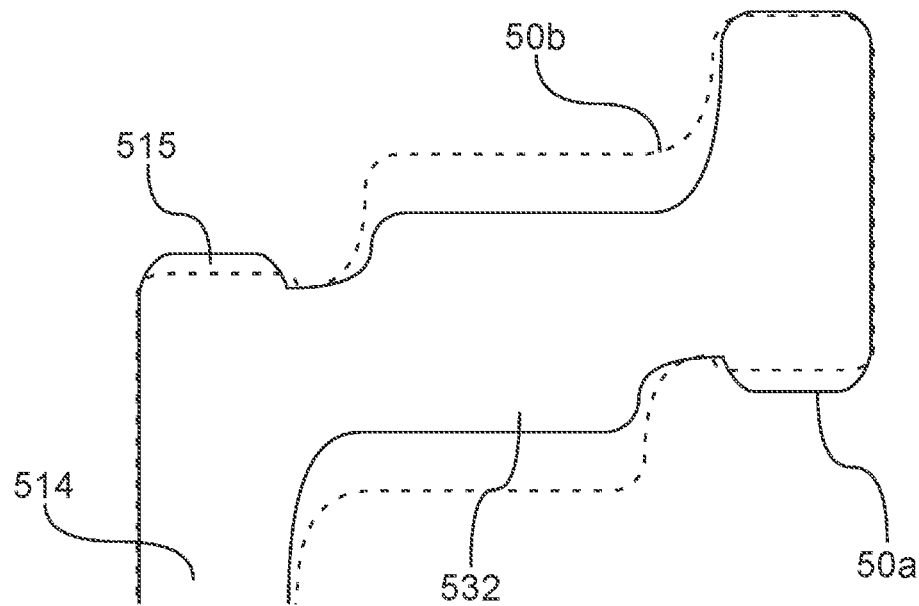
FIG. 7 is a diagram illustrating mounting dimensions of a plurality of recirculation members.

Design is made such that in the case where two or more ball screw devices 40a, 40b that are different in screw shaft diameter are compared, at least one of the mounting dimensions of one ball screw device is larger than that of the other ball screw device and at least one of the mounting dimensions of the one ball screw device is smaller than that of the other ball screw device. For example, as illustrated in FIG. 7, in the case where a circumferential length of an opposite-side part 515 at the side opposite to a pick-up opening portion 54 in a recirculation member 50a is made larger than that of a recirculation member 50b, a circumferential length of a projection portion 532 of a connection passage portion 53 of the recirculation member 50a is made smaller than that of the recirculation member 50b. The above circumferential lengths are, for example, distances from a center plane CP that is located at a circumferential center of the recirculation member 50 and that extends through a center axis of the nut to ends of the respective portions. With this configuration, in the two kinds of ball screw devices 40a, 40b that are different in screw shaft diameter, the recirculation member 50a of the ball screw device 40a interferes with a mounting recess portion 213b of a nut 21b of the ball screw device 40b and is thus prevented from being mounted in the mounting recess portion 213b. On the other hand, also, the recirculation member 50b interferes with the mounting recess portion 213a of the nut 21a and is thus prevented from being mounted in the mounting recess portion 213a.

The circumferential length of the part at the side opposite, in the circumferential direction, to the pick-up opening portion 54 in the pick-up portion 51, and the circumferential length of the connection passage portion 53 may be adjusted as the mounting dimensions. The circumferential length of the part at the side opposite, in the circumferential direction, to the pick-up opening portion 54 in the pick-up portion 51, and the circumferential length of the connection passage portion 53 are less likely to affect the shape of the recirculation passage R2 for the balls 24. Adjustment of the mounting dimensions using these lengths enables easy adjustment of a center track for the balls 24 rolling in the recirculation passage R2 irrespective of the adjusted mounting dimensions. More specifically, it is desirable to maximize a three-dimensional curvature radius of the center track for the balls 24 in the recirculation member 50 according to the screw shaft diameter. Also, when the mounting recess portion 213 is provided in the nut 21, from the perspective of, e.g., enhancement in work efficiency, it is preferable to provide a margin to an axial length of a recess portion corresponding to the connection passage portion 53, and thus, adjustment of the aforementioned two parts as the mounting dimensions provides enhancement in manufacturability. Also, in a plurality of ball screw devices that are different in screw shaft diameter, the center tracks for the balls 24 in the recirculation members 50 may be the same in plan views of center tracks seen in the radial directions of the nuts 21. In this case, it is possible to reduce man-hours for design of the center tracks for the balls 24.

In a plurality of ball screw devices 40 that are different in screw shaft diameter, two dimensions of the mounting dimensions are changed. The mounting dimensions of the recirculation member 50 are selected from the circumferential length of the pick-up opening portion 54-side part 514 of the pick-up portion 51 (i.e., the part 514 at the side of the pick-up opening portion 54 in the pick-up portion 51), the circumferential length of the opposite-side part 515 at the side opposite to the pick-up opening portion 54 in the pick-up portion 51, the circumferential length of the connection passage portion 53 and the axial length of the connection passage portion 53. When the mounting dimensions are changed, the mounting dimension of the recirculation member 50 may be adjusted using the circumferential length of the projection portion 532 (i.e., by adjusting the circumferential length of the projection portion 532). The projection portion of the recirculation member 50 is a part that projects from the body portion in which the recirculation passage R2 is provided and is not related to the shape of the recirculation passage R2. Therefore, it is possible to adjust the mounting dimension while maintaining the shape of the recirculation passage R2.

In order to prevent a recirculation member from being mounted in a mounting recess portion of a nut having wrong specifications, it is necessary to increase any of mounting dimensions. However, if only one of mounting dimensions of the recirculation member of one ball screw device of the ball screw devices 40a, 40b that are different in screw shaft diameter is increased, the recirculation member of the other ball screw device is housed in the mounting recess portion 213 of the nut 21 of the one ball screw device although a gap is left. Therefore, in the ball screw devices 40a, 40b that are different in screw shaft diameter, as a result of an increase of one length and a decrease of another length in at least two mounting dimensions, the recirculation member 50 of one ball screw device interferes with the mounting recess portion 213 of the nut 21 having different specifications in the other ball screw device at one of parts with one mounting dimension and the other mounting dimension and is thus prevented from being mounted in the mounting recess portion 213. Consequently, even if a plurality of ball screw devices that are different in screw shaft diameter are produced on the same production line, it is possible to prevent erroneous assembling.

Second Example

Figure 8:
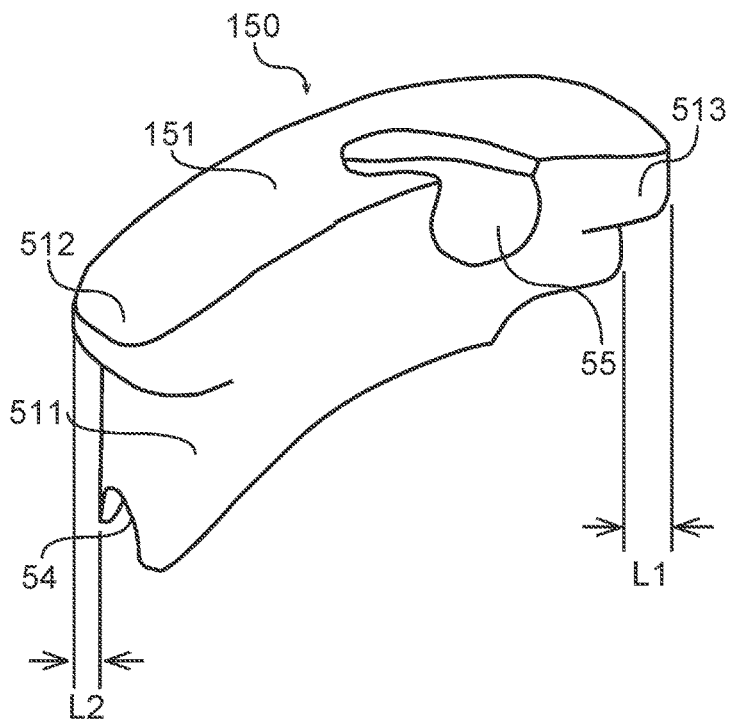
FIG. 8 is a perspective view illustrating a recirculation member according to a second example.
Figure 9:
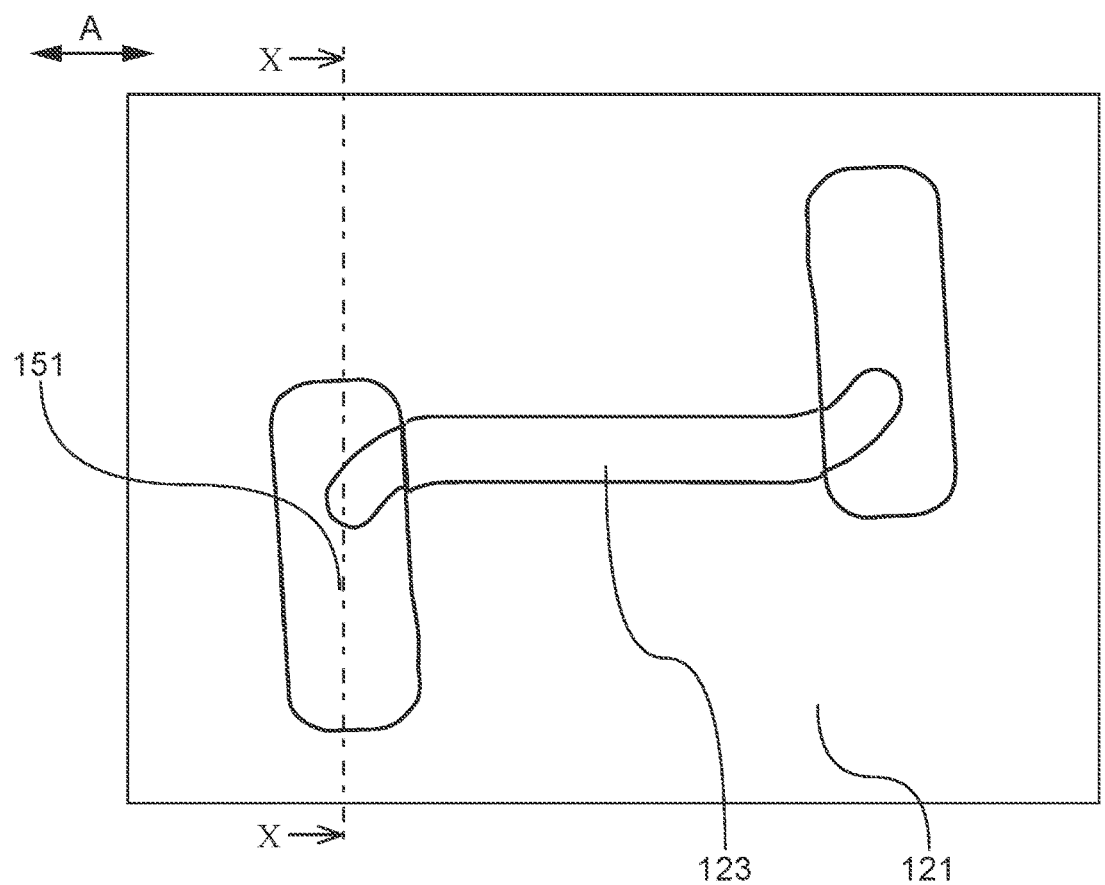
FIG. 9 is a diagram illustrating an outer appearance of a nut with recirculation members according to the second example mounted therein.
Figure 10:
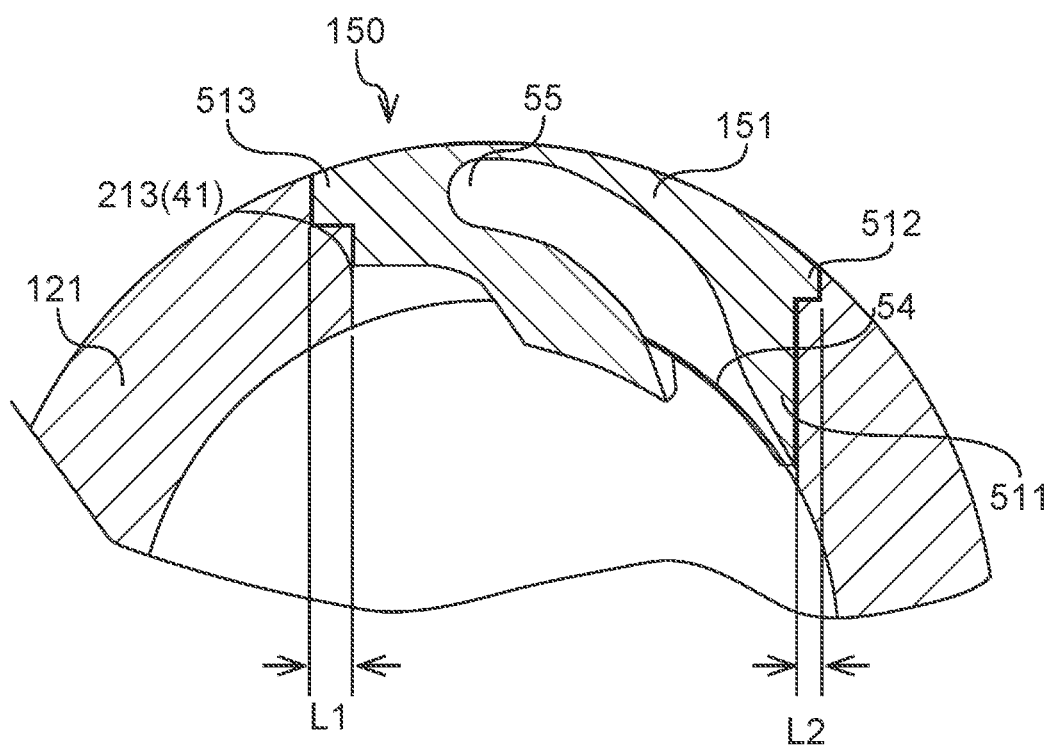
FIG. 10 is a sectional view along X-X in FIG. 9.

The first example indicates an example of the integral-type recirculation member 50 in which the pair of pick-up portions 51, 52 and the connection passage portion 53 are provided integrally. As illustrated in FIGS. 8 to 10, in a ball screw device 140 of a second example, only pick-up portions 151, 152 are provided as recirculation members 150.

The pick-up portions 151, 152 are inserted and fixed in respective mounting holes provided in a nut 121. The mounting holes are mounting recess portions. In an outer peripheral surface of the nut 121, a recirculation groove 123 is provided in such a manner as to connect connection portions of the mounted pick-up portions 151, 152. Balls 24 picked up by one pick-up portion circulate to a rolling passage R1 from the other pick-up portion through the recirculation groove 123. In other words, a pathway from a pick-up opening portion 54 of one pick-up portion to a pick-up opening portion 54 of the other pick-up portion through a connection portion 55 of the one pick-up portion, the recirculation groove 123 and a connection portion 55 of the other pick-up portion serves as a recirculation passage R2.

In this case, each recirculation member 150 includes a body portion 511 which is housed in a mounting hole of the nut 121 and in which a part of the recirculation passage R2 is provided, and projection portions that are provided at the outer peripheral side of the nut 121 relative to the body portion 511 (i.e., projection portions that are provided closer to the outer periphery of the nut 121 than the body portion 511 is), and that project in a circumferential direction of the nut 121. The recirculation member 150 includes a projection portion 512 that projects at the side of the pick-up opening portion 54 in a longitudinal direction of the pick-up portion 151, and a projection portion 513 that projects at the side opposite to the pick-up opening portion 54 in the pick-up portion 151. As illustrated in FIG. 10, the pick-up portion 151 has a substantial T-shape in which the outer peripheral side of the nut 121 projects in a section orthogonal to an axial direction of the nut 121. For the recirculation member 150, a circumferential length of the projection portion 512 at the side of the pick-up opening portion 54 in the pick-up portion 151 and a circumferential length of the projection portion 513 at the side opposite to the pick-up opening portion 54 in the pick-up portion 51 are adjusted as mounting dimensions. More specifically, in the case where a length L1 of a part circumferentially projecting from a side surface of the body portion 511 in the circumferential length of the projection portion 513 at the side opposite to the pick-up opening portion 54 in the pick-up portion 151 is made larger than that of another ball screw device, a length L2 of a part circumferentially projecting from a side surface of the body portion 511 in the circumferential length of the projection portion 512 at the side of the pick-up opening portion 54 in the pick-up portion 151 is made smaller than that of the other ball screw device. Employment of this configuration makes it possible to create a part that interferes with a mounting recess portion 213 while a length of the body portion 511 being kept constant. Also, one of the mounting dimensions to be changed may be an axial dimension of the recirculation member 150, for example, an axial length of the projection portion 512 or 513. The recirculation member 150 makes it possible to prevent erroneous assembling by changing amounts of projection at the right and left sides of the T-shape in a sectional view orthogonal to the axial direction of the nut 121.

In a ball screw in each of the first and second examples of the disclosure, a deflector-type recirculation member including a recirculation passage having a closed section is inserted in a hole extending from an outer periphery to an inner periphery of a nut and thus forms a ball circulation passage. However, the disclosure is not limited to these examples. The disclosure may be applied to an internal deflector-type ball screw in which an internal deflector including a recirculation passage that opens toward an inner periphery of a nut is mounted in a recess portion in the inner periphery of the nut or an end deflector-type ball screw in which recirculation members that pick up balls from a rolling passage of a screw shaft and circulates the balls are mounted in respective recess portions provided at opposite end portions in an axial direction of a nut.

What is claimed is:

1. A ball screw device comprising
a plurality of ball screw devices each including:
    a screw shaft including a helical outer peripheral rolling groove provided in an outer peripheral surface of the screw shaft;
    a tubular nut including a helical inner peripheral rolling groove provided in an inner peripheral surface of the nut such that the inner peripheral rolling groove faces the outer peripheral rolling groove;
    a plurality of balls rollably disposed in a rolling passage provided between the outer peripheral rolling groove and the inner peripheral rolling groove; and
    a recirculation member that provides a shortcut between two points in the rolling passage and forms a recirculation passage that allows the balls to be endlessly circulated between the recirculation passage and the rolling passage, wherein:
the recirculation member includes
    a pair of pick-up portions whose respective longitudinal directions are set to be a circumferential direction of the nut, the pick-up portions being disposed point-symmetrically to each other and each including a pick-up opening portion that opens toward the inner peripheral surface of the nut at an end in the longitudinal direction and a connection portion that communicates with the pick-up opening portion and that opens toward a side of an outer peripheral surface of the nut, and a connection passage portion that is joined between the pick-up portions and that includes a through-hole connecting the connection portions; and in one ball screw device of the plurality of ball screw devices, the recirculation member is larger than the recirculation member in another ball screw device of the plurality of ball screw devices in terms of one mounting dimension of two mounting dimensions selected from a circumferential length of a part at a side of the pick-up opening portion in each of the pick-up portions, a circumferential length of a part at a side opposite to the pick-up opening portion in each of the pick-up portions, a circumferential length of the connection passage portion and an axial length of the connection passage portion, and the recirculation member is smaller than the recirculation member in the other ball screw device in terms of another mounting dimension of the two mounting dimensions, the other ball screw device being different in a diameter of the screw shaft from the one ball screw device.

2. The ball screw device according to claim 1, wherein in the one ball screw device, the recirculation member is larger than the recirculation member in the other ball screw device that is different in the diameter of the screw shaft from the one ball screw device, in terms of one mounting dimension of the mounting dimensions that are the circumferential length of the part at the side opposite to the pick-up opening portion in each of the pick-up portions and the circumferential length of the connection passage portion, and is smaller than the recirculation member in the other ball screw device in terms of another mounting dimension of the mounting dimensions that are the circumferential length of the part at the side opposite to the pick-up opening portion in each of the pick-up portions and the circumferential length of the connection passage portion.

3. The ball screw device according to claim 1, wherein in the plurality of ball screw devices, lengths of the recirculation members in axial directions of the nuts are uniform.

4. The ball screw device according to claim 1, wherein the plurality of ball screw devices have a same lead, a same diameter of each of the balls, a same sectional shape of the outer peripheral rolling groove of the screw shaft and a same sectional shape of the inner peripheral rolling groove of the nut.

5. The ball screw device according to claim 1, wherein respective center tracks for the balls rolling in the recirculation passages in the plurality of ball screw devices are same in plan views of the center tracks seen in radial directions of the nuts.

6. The ball screw device according to claim 1, wherein:
the recirculation member includes a projection portion provided at an outer peripheral side of the nut, the projection portion projecting in the circumferential direction of the nut; and a length of a mounting dimension of the mounting dimensions of the recirculation member is changed by changing a length of the projection portion.

7. A ball screw device comprising
a plurality of ball screw devices each including:
a screw shaft including a helical outer peripheral rolling groove provided in an outer peripheral surface of the screw shaft;

a tubular nut including a helical inner peripheral rolling groove provided in an inner peripheral surface of the nut such that the inner peripheral rolling groove faces the outer peripheral rolling groove, a pair of mounting holes radially extending through an outer periphery of the nut and an inner periphery of the nut, and an axially extending recirculation groove provided in an outer peripheral surface of the nut;

a plurality of balls rollably disposed in a rolling passage provided between the outer peripheral rolling groove and the inner peripheral rolling groove; and a pair of recirculation members that provides a shortcut between two points in the rolling passage and forms a recirculation passage that allows the balls to be endlessly circulated between the recirculation passage and the rolling passage, wherein:

respective longitudinal directions of the recirculation members are set to be a circumferential direction of the nut, the recirculation members are inserted in the respective mounting holes of the nut and disposed point-symmetrically to each other, and each of the recirculation members includes a pick-up opening portion that opens toward the inner peripheral surface of the nut at an end in the longitudinal direction, and a connection portion that communicates with the pick-up opening portion and that opens toward the outer peripheral surface of the nut;

the connection portion is connected to the recirculation groove;

each of the recirculation members includes projection portions provided at an outer peripheral side of the nut, the projection portions projecting in the circumferential direction of the nut; and in one ball screw device of the plurality of ball screw devices, each of the recirculation members is larger than each of the recirculation members in another ball screw device of the plurality of ball screw devices in terms of one mounting dimension of mounting dimensions that are a circumferential length of the projection portion at a side of the pick-up opening portion of each of the recirculation members and a circumferential length of the projection portion at a side opposite to the pick-up opening portion of each of the recirculation members, and each of the recirculation members is smaller than each of the recirculation members in the other ball screw device in terms of another mounting dimension of the mounting dimensions, the other ball screw device being different in a diameter of the screw shaft from the one ball screw device.

* * * * *